(12) United States Patent
Gentry

(10) Patent No.: US 10,457,494 B1
(45) Date of Patent: Oct. 29, 2019

(54) HEATED BELT SCRAPER BAR APPARATUS

(71) Applicant: Lenard Warren Gentry, Fort McMurray (CA)

(72) Inventor: Lenard Warren Gentry, Fort McMurray (CA)

(*) Notice: Subject to any disclaimer, the term of this patent is extended or adjusted under 35 U.S.C. 154(b) by 0 days.

(21) Appl. No.: 15/907,809

(22) Filed: Feb. 28, 2018

(51) Int. Cl.
*B65G 45/10* (2006.01)
*B65G 45/16* (2006.01)
*B08B 1/00* (2006.01)

(52) U.S. Cl.
CPC .............. *B65G 45/16* (2013.01); *B65G 45/10* (2013.01); *B08B 1/005* (2013.01)

(58) Field of Classification Search
CPC ......... B65G 45/10; B65G 45/12; B65G 45/16
USPC ........................................ 198/494, 497, 499
See application file for complete search history.

(56) References Cited

U.S. PATENT DOCUMENTS

| | | | |
|---|---|---|---|
| 4,182,444 A | 1/1980 | Fisher | |
| 4,927,003 A * | 5/1990 | Swinderman | B65G 45/12 198/497 |
| 5,014,844 A * | 5/1991 | Anttonen | B65G 45/16 198/499 |
| 5,024,319 A * | 6/1991 | Dixon | B65G 15/00 198/494 |
| 6,638,062 B1 * | 10/2003 | Davidson | B03B 5/52 198/494 |
| 6,971,503 B2 * | 12/2005 | Thompson | B65G 45/22 198/494 |

* cited by examiner

*Primary Examiner* — James R Bidwell
(74) *Attorney, Agent, or Firm* — Integrity Patent Group, PLC; Charles E. Runyan

(57) ABSTRACT

A heated scraper bar assembly for a conveyor belt system having a reservoir configured to retain a liquid. A heating element is configured to heat the liquid in the reservoir. A scraping system is affixed to the reservoir and in thermal communication with the liquid. The scraping system increases in temperature through the thermal communication with the heated liquid to prohibit frozen process materials from sticking to the scraping system. The scraper bar assembly is useful for removing frozen debris from an active conveyor belt system.

17 Claims, 4 Drawing Sheets

HEATED BELT SCRAPER BAR APPARATUS

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of scrapers and more specifically relates to heated scraper bar.

2. Description of Related Art

Conveyor belts encounter difficulties during freezing conditions when transferring material from one location to another. A process material combined with a liquid may freeze into clumps, and further, freeze onto an active conveyor belt. Conveyor belt scraper assemblies are employed to remove such attached material from a conveyor belt. Frozen process material from a conveyor belt also is known to stick to conventional conveyor belt scrapers. This frozen process material will build up on a belt scraper and inhibit its functionality by allowing the process material to remain attached to the belt, or by allowing the process material to fall onto the ground. For an operation to run smoothly, conveyor belts must be fully operational, rather than leaking process material at a junction. Existing attempts to solve this problem have led to intricate and expensive solutions that may be cost prohibitive.

U.S. Pat. No. 4,182,444 to Eugene W. Fisher relates to a heated conveyor belt scraper. The described heated conveyor belt scraper includes scraper blade for a conveyor belt for removing material such as hot asphalt mix which would otherwise tend to stick to the conveyor belt surface. A scraper blade assembly is mounted to a swinging arm which is pivoted to the conveyor frame and positioned near the underside of the discharge end of the conveyor. A blade is mounted transversely to the conveyor belt for scraping material from its surface, and heating elements are provided for heating the blade to prevent material build-up on the scraper. A control system including sensors, a control valve and a control cylinder is provided for pivoting the blade away from the conveyor to allow passage of the conveyor splice without damaging it, or in response to a conveyor belt stoppage.

BRIEF SUMMARY OF THE INVENTION

In view of the foregoing disadvantages inherent in the known scraper art, the present disclosure provides a novel heated belt scraper bar. The general purpose of the present disclosure, which will be described subsequently in greater detail, is to provide an efficient and effective solution for use with conveyor systems.

A scraper is disclosed herein. The scraper includes a heated scraper bar assembly for a conveyor belt system. The scraper bar assembly includes a reservoir configured to retain a liquid. The scraper bar assembly further includes a heating-element configured to heat the liquid in the reservoir. A scraping-system, the scraping-system is affixed to the reservoir and in thermal communication with the liquid. The scraper bar assembly may be configured to remove frozen debris from an active conveyor belt system.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a heated belt scraper bar, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a scraper and more particularly to a heated belt scraper bar as used to improve the use of conveyors.

Generally, the oil heated scraper bar assembly is preferably heated by a heater probe submerged in an oil within a reservoir of the heated scraper bar assembly. The heated scraper bar assembly prevents materials from freezing around the scraper bar and causing the scraper to not function properly. When the scraper does not scrape material from the belt of a conveyor belt system it causes material to fall from the belt onto the ground, thereby making a 'mess'. By heating the scraper bar, and the attached scraper pads, as disclosed herein, material is prevented from freezing to the scraper bar assembly and causing material to fall to the ground. Ensuring the scraper is functional reduces downtime and manual labor spent cleaning up fallen material.

Figure 1:
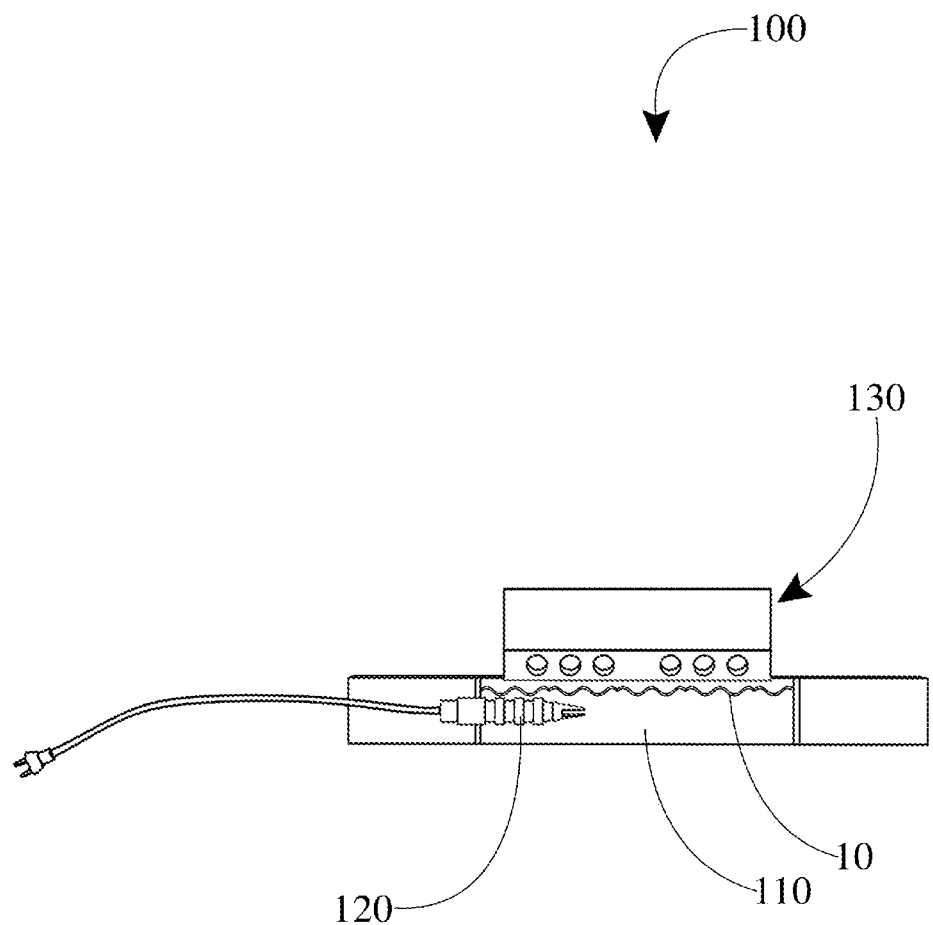
FIG. 1 is a front perspective view of the scraper, according to an embodiment of the disclosure.
Figure 2:
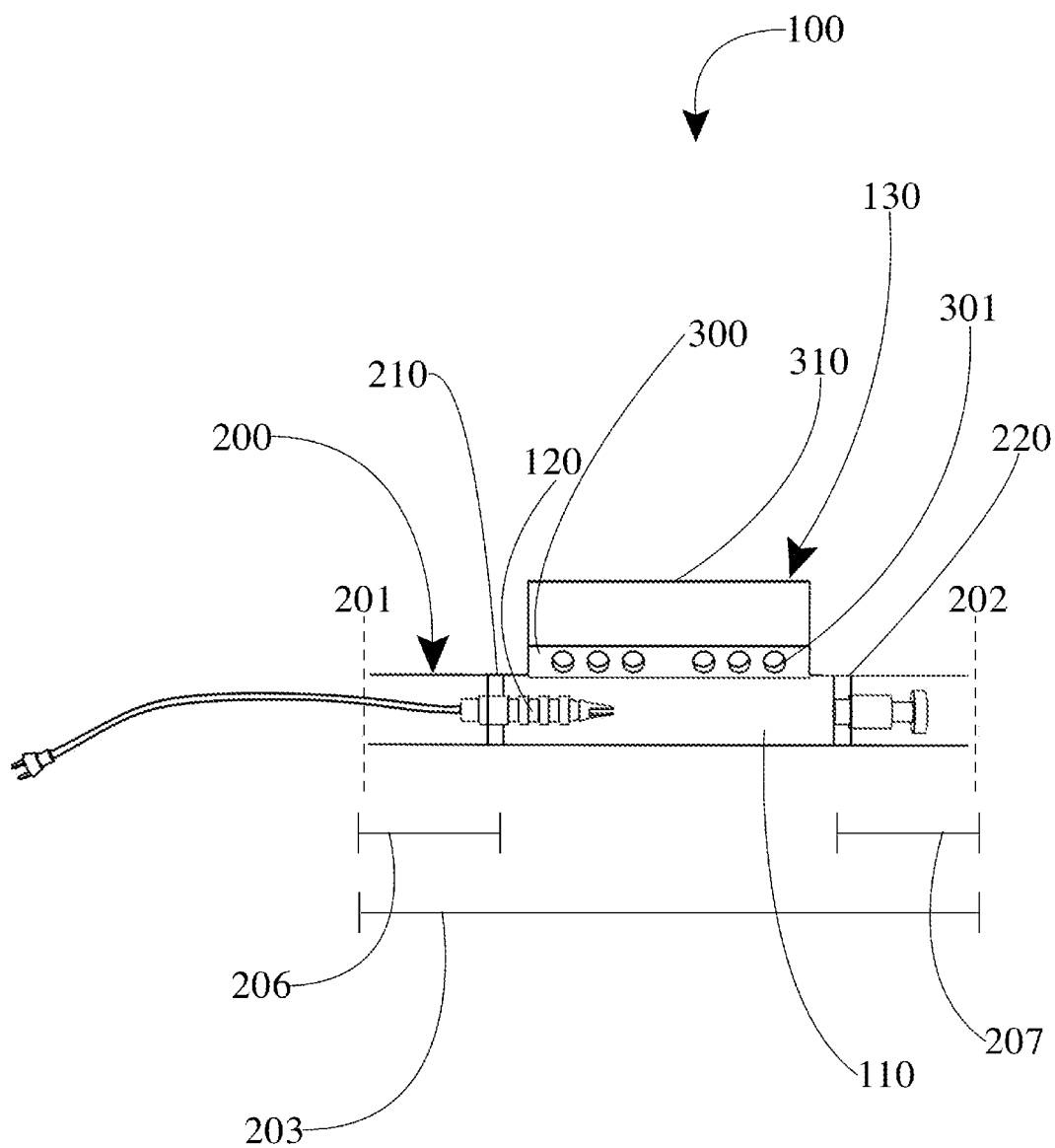
FIG. 2 is a front perspective view of the scraper of FIG. 1, according to an embodiment of the present disclosure.
Figure 3:
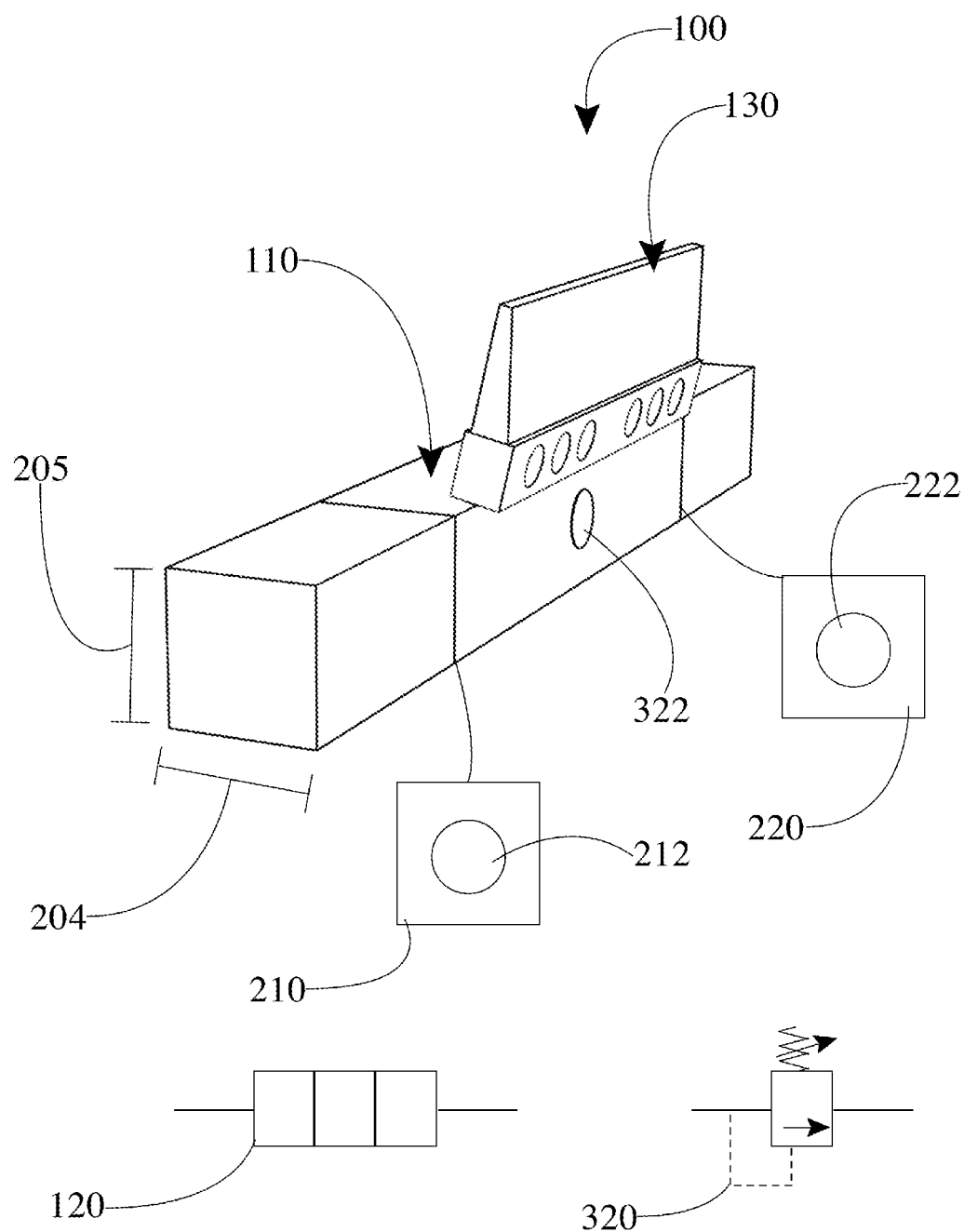
FIG. 3 is a front perspective view of the scraper of FIG. 1, according to an embodiment of the present disclosure.
Figure 4:
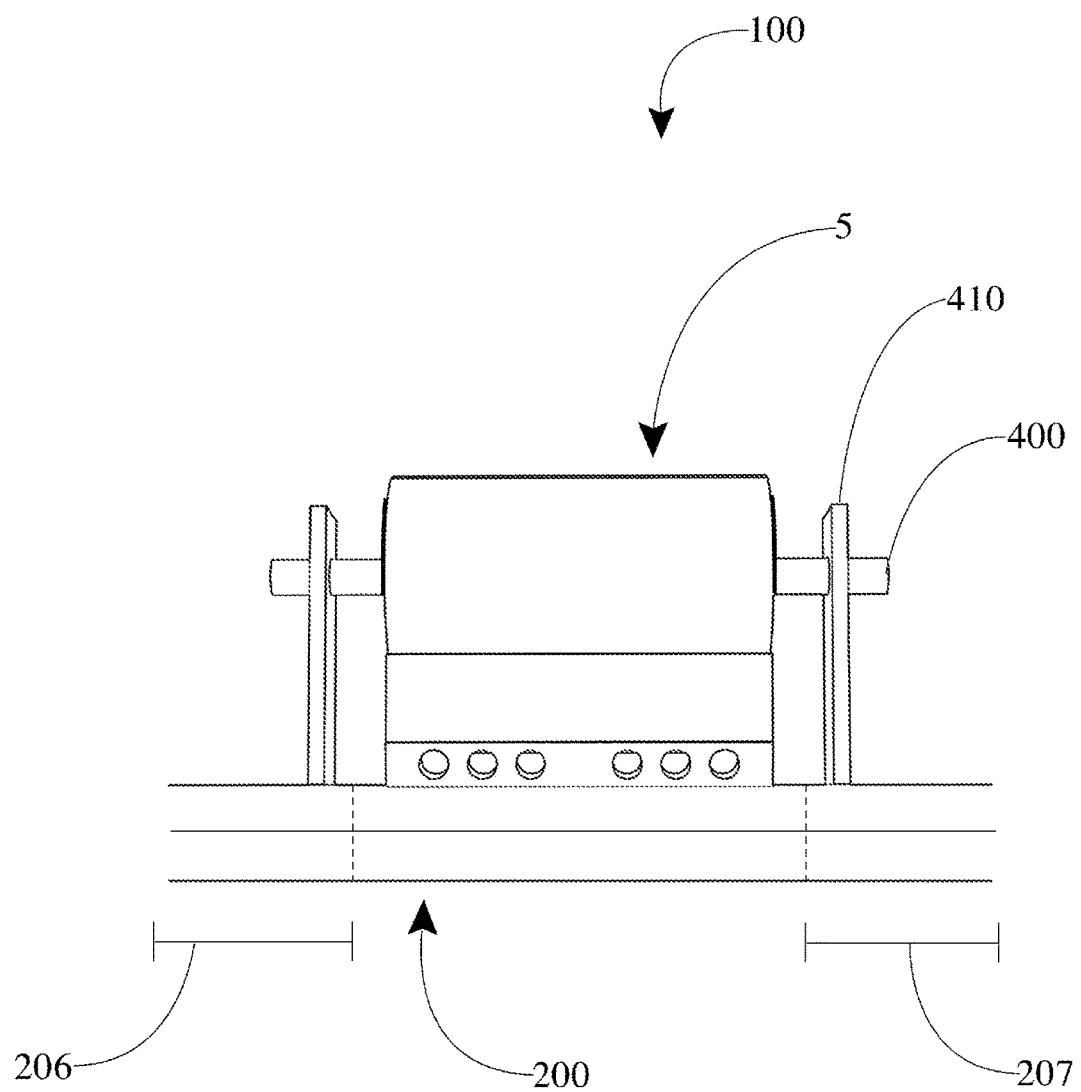
FIG. 4 is a front perspective view of the scraper of FIG. 1, according to an embodiment of the present disclosure.

Referring now more specifically to the drawings by numerals of reference, there is shown in FIGS. 1-4, various views of a scraper bar assembly 100. FIG. 1 shows a scraper bar assembly 100, according to an embodiment of the present disclosure. As Illustrated, the scraper bar assembly 100 may include a reservoir 110; the reservoir 110 is configured to retain a liquid 10. Scraper bar assembly 100 further comprises a heating-element 120; the heating-element 120 is configured to heat the liquid 10 in the reservoir 110. The scraping-system 130 may be affixed to the reservoir 110 and in thermal communication with the liquid 10. The scraper bar assembly 100 is configured to remove frozen debris from an active conveyor belt system 5 (FIG. 4).

FIG. 2 shows a front perspective view of the scraper 100 of FIG. 1, according to an embodiment of the present disclosure. As above, the scraper bar assembly 100 may include a reservoir 110, the reservoir 110 configured to retain a liquid 10 (FIG. 1). The heating-element 120 is configured to heat the liquid 10 in the reservoir 110. The scraping-system 130 is affixed to the reservoir 110 and in thermal communication with the liquid 10. The reservoir 110 is preferably comprised of a metallic-tube 200 having an interior volume. The metallic-tube 200 further comprises a first-end 201, a second-end 202, a tube-length 203, a tube-width 204 (FIG. 3), and a tube-height 205 (FIG. 3). The reservoir 110 further comprises a first-wall 210; the first-wall 210 disposed a first-distance 206 from the first-end 201; the first-wall 210 extending the tube-height 205 and the tube-width 204 within the interior volume of the metallic-tube 200. The reservoir 110 further comprises second-wall 220; the second-wall 220 disposed a second-distance 207 from the second-end 202; the second-wall 220 extending the tube-height 205 and the tube-width 204 within the interior volume of the metallic-tube 200.

The scraping-system 130 includes a scraper-mount 300 comprising thermally conductive material mechanically affixed to the reservoir 110. The scraper-mount 300 is disposed a partial-distance of the tube-length 203 along an edge of the metallic-tube 200. The scraper-mount 300 is disposed between the conveyor belt system 5 (FIG. 4) and the reservoir 110. The scraping-system 130 further includes a scraper-pad 310 comprising thermally conductive material, the scraper-pad 310 is removably attached to the scraper-mount 300 and configured to be in physical communication with the conveyor belt system 5. The scraper-mount 300 includes scraper-apertures 301 defining a passage for fasteners to retain the scraping-pad 310. The scraper-mount 300 and the scraper-pad 310 are in thermal communication with the liquid 10.

Referring now to FIG. 3 showing a front perspective view of the scraper bar assembly 100 of FIG. 1, according to an embodiment of the present disclosure. As above, the scraper bar assembly 100 may include a reservoir 110; the reservoir 110 configured to retain a liquid 10 (FIG. 1). The heating-element 120 is configured to heat the liquid 10 in the reservoir 110. The scraping-system 130 is affixed to the reservoir 110 and in thermal communication with the liquid 10. The first-wall 210 includes a threaded-first-aperture 212 configured to receive the heating-element 120. The second-wall 220 includes a threaded-second-aperture 222 configured to receive the pressure relief valve 320, and alternatively, a second-heating-element 120. The reservoir may further 110 include a threaded-third-aperture 322 configured to receive the pressure relief valve 320.

FIG. 4 shows a front perspective view of the scraper bar assembly 100 of FIG. 1, according to an embodiment of the present disclosure. As above, the scraper bar assembly 100 may include a mount 400 including tensioners 410 configured to adjust the location of the scraper bar assembly 100 relative to the conveyor belt system 5. A first-length of material of the metallic-tube 200 defined by the first-distance 206 and a second-length of material of the metallic-tube 200 defined by the second-distance 207 are configured to be removed and accordingly sized to the conveyor belt system 5.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A heated scraper bar assembly for a conveyor belt system, the scraper bar assembly comprising:
   a reservoir, the reservoir configured to retain a liquid;
   a heating-element, the heating-element configured to heat the liquid in the reservoir; and
   a scraping-system, the scraping system affixed to the reservoir and in thermal communication with the liquid; and
   wherein the scraper bar assembly is configured to remove frozen debris from an active conveyor belt system.

2. The scraper bar assembly of claim 1, wherein the reservoir is comprised of a metallic-tube having an interior volume, a first-end, a second-end, a tube-length, a tube-width, and a tube-height.

3. The scraper bar assembly of claim 2, wherein the reservoir further comprises a first-wall, the first wall disposed a first-distance from the first-end, the first-wall extending the tube-height and the tube-width within the interior volume of the metallic-tube.

4. The scraper bar assembly of claim 3, wherein the reservoir further comprises a second-wall, the second-wall disposed a second-distance from the from the second-end, the second-wall extending the tube-height and the tube-width within the interior volume of the metallic-tube.

5. The scraper bar assembly of claim 1, wherein the scraping-system includes a scraper-mount comprising thermally conductive material mechanically affixed to the reservoir, the scraper-mount disposed between the conveyor belt system and the reservoir.

6. The scraper bar assembly of claim 5, wherein the scraping system includes a scraper-pad comprising thermally conductive material, the scraper-pad is removably attached to the scraper-mount and configured to be in physical communication with the conveyor belt system.

7. The scraper bar assembly of claim 5, wherein the scraper-mount is in thermal communication with the liquid.

8. The scraper bar assembly of claim 6, wherein the scraper-pad is in thermal communication with the liquid.

9. The scraper bar assembly of claim 5, wherein the scraper-mount is disposed a partial-distance of the tube-length along an edge of the metallic-tube.

10. The scraper bar assembly of claim 5, wherein the scraper-mount includes scraper-apertures defining a passage for fasteners to retain the scraping-pad.

11. The scraper bar assembly of claim 4, wherein the reservoir further includes a pressure relief valve configured to regulate pressure exerting force outwardly from the reservoir.

12. The scraper bar assembly of claim 3, wherein the first-wall includes a threaded-first-aperture configured to receive the heating-element.

13. The scraper bar assembly of claim 4, wherein the second-wall includes a threaded-second-aperture configured to receive the pressure relief valve, and alternatively, a second-heating-element.

14. The scraper bar assembly of claim 11, wherein the reservoir includes a threaded-third-aperture configured to receive the pressure relief valve.

15. The scraper bar assembly of claim 1, wherein the scraper bar further includes a mount including tensioners configured to adjust the location of the scraper bar relative to the conveyor belt system.

16. The scraper bar assembly of claim 3, wherein a first-length of material of the metallic-tube defined by the first-distance and a second-length of material of the metallic-tube defined by the second-distance are configured to be removed and accordingly sized to the conveyor belt system.

17. A scraper bar assembly, the scraper bar assembly comprising:
   a reservoir, the reservoir configured to retain a liquid,
   a heating-element, the heating-element configured to heat the liquid in the reservoir,
   a scraping-system, the scraping system affixed to the reservoir and in thermal communication with the liquid,
   wherein the scraper bar assembly is configured to remove frozen debris from an active conveyor belt system;
   wherein the reservoir is comprised of a metallic-tube having an interior volume, a first-end, a second-end, a tube-length, a tube-width, and a tube-height;
   wherein the reservoir further comprises a first-wall, the first wall disposed a first distance from the reservoir first-end, the first-wall extending the tube-height and the tube-width within the interior volume of the metallic tube;
   wherein the reservoir further comprises second-wall, the second-wall disposed a second-distance from the second-end, the second-wall extending the tube-height and the tube-width within the interior volume of the metallic-tube;
   wherein the scraping-system includes a scraper-mount comprising thermally conductive material mechanically affixed to the reservoir, the scraper-mount disposed between the conveyor belt system and the reservoir;
   wherein the scraping system includes a scraper-pad comprising thermally conductive material, the scraper-pad is removably attached to the scraper-mount and configured to be in physical communication with the conveyor belt system;
   wherein the scraper-mount and the scraper-pad is each in thermal communication with the liquid;
   wherein the scraper-mount is disposed a partial-distance of the tube-length along an edge of the metallic-tube;
   wherein the scraper-mount includes scraper-apertures defining a passage for fasteners to retain the scraping-pad;
   wherein the reservoir further includes a pressure relief valve configured to regulate pressure exerting force outwardly from the reservoir;
   wherein the first-wall includes a threaded-first-aperture configured to receive the heating-element;
   wherein the second-wall includes a threaded-second-aperture configured to receive the pressure relief valve, and alternatively, a second-heating-element;
   wherein the reservoir includes a threaded-third-aperture configured to receive the pressure relief valve;
   wherein the scraper bar further includes a mount including tensioners configured to adjust the location of the scraper bar relative to the conveyor belt system; and
   wherein a first-length of material of the metallic-tube defined by the first-distance and a second-length of material of the metallic-tube defined by the second-distance are configured to be removed and accordingly sized to the conveyor belt system.

* * * * *